(12) United States Patent
Hintz (10) Patent No.: US 10,279,751 B2
(45) Date of Patent: May 7, 2019

(54) ADJUSTABLE CARRIER SYSTEM

(71) Applicant: Scott L. Hintz, Yale, SD (US)

(72) Inventor: Scott L. Hintz, Yale, SD (US)

( * ) Notice: Subject to any disclaimer, the term of this patent is extended or adjusted under 35 U.S.C. 154(b) by 4 days.

(21) Appl. No.: 15/643,920

(22) Filed: Jul. 7, 2017

(65) Prior Publication Data
US 2019/0009730 A1 Jan. 10, 2019

(51) Int. Cl.
*B60R 9/06* (2006.01)
*B60R 11/00* (2006.01)
*B62J 7/00* (2006.01)

(52) U.S. Cl.
CPC ........... *B60R 9/06* (2013.01); *B60R 2011/008* (2013.01); *B62J 7/00* (2013.01)

(58) Field of Classification Search
CPC . B66B 9/187; B66B 9/16; E21B 7/027; E21B 7/028; Y10S 187/90
See application file for complete search history.

(56) References Cited

U.S. PATENT DOCUMENTS

| | | | | |
|---|---|---|---|---|
| 1,078,998 A | * | 11/1913 | Ernst | B66B 9/187 187/262 |
| 1,412,159 A | * | 4/1922 | Bolte | B66F 9/065 212/199 |
| 2,187,283 A | * | 1/1940 | Scheutz | A61G 7/1003 254/100 |
| 2,208,968 A | * | 7/1940 | Ernst | B66B 9/00 187/401 |
| 2,409,007 A | * | 10/1946 | Young | E05G 7/004 109/18 |
| 2,419,145 A | * | 4/1947 | Kersenbrock | B66C 23/22 182/141 |
| 2,433,921 A | * | 1/1948 | Nelson | B66C 23/48 212/199 |
| 2,483,109 A | * | 9/1949 | Smith | B66F 19/00 212/199 |
| 2,621,820 A | * | 12/1952 | O'Sullivan | B66B 9/187 187/900 |
| 2,774,568 A | * | 12/1956 | Jones | E21B 7/02 173/140 |
| 3,182,826 A | | 5/1965 | Mutto | |
| 3,203,044 A | * | 8/1965 | Tarbe De Saint Hardouin | B05C 5/00 425/126.1 |
| 3,367,427 A | * | 2/1968 | Baumgardner | E21B 7/028 173/185 |

(Continued)

*Primary Examiner* — Gregory W Adams
(74) *Attorney, Agent, or Firm* — Neustel Law Offices (57) ABSTRACT

An adjustable carrier system which aids in the lifting, lower, and transport of heavy objects by a vehicle such as an ATV. The adjustable carrier system generally includes a lower support which is adapted to be connected to a vehicle. A vertical support extends upwardly in a vertical orientation from the lower support. A winch includes a cable which extends through a lower pulley, upwardly alongside the vertical support, through an upper pulley, and downwardly alongside the vertical support to connect at its distal end to a sleeve. The sleeve is movably connected to the vertical support such that the cable may raise or lower the sleeve along the vertical support through use of a winch. A carrier for such as a basket or platform for holding an object is connected to the sleeve such that the carrier is also raised or lowered along the vertical support by the cable.

10 Claims, 7 Drawing Sheets

(56) References Cited

U.S. PATENT DOCUMENTS

| | | | | |
|---|---|---|---|---|
| 3,837,513 | A | * | 9/1974 | Adamek ............... B60P 1/4428 414/462 |
| 3,901,999 | A | * | 8/1975 | Landis ..................... H05B 6/24 373/156 |
| 4,133,154 | A | * | 1/1979 | Ruzicka .................. E02D 27/42 52/100 |
| 4,440,640 | A | * | 4/1984 | Groteke ................. B01D 29/66 210/237 |
| 4,543,752 | A | * | 10/1985 | Kotting ............... B24B 13/0055 451/384 |
| 4,697,306 | A | * | 10/1987 | Rhodes ................... E05F 1/063 16/317 |
| 4,759,161 | A | * | 7/1988 | Kucyk, Jr. .............. E01F 9/635 404/10 |
| 5,160,238 | A | * | 11/1992 | Kambara ............... B66C 23/163 187/273 |
| 5,363,925 | A | * | 11/1994 | Gallagher ............... E21B 7/027 173/185 |
| 5,411,113 | A | * | 5/1995 | Lubinski .................. E04G 7/22 182/186.7 |
| 5,535,555 | A | * | 7/1996 | Boyd ...................... E01F 9/635 248/548 |
| 5,595,265 | A | * | 1/1997 | Lebrocquy ............ A01M 31/02 187/244 |
| 5,772,174 | A | * | 6/1998 | Hirsch ................... A47B 23/04 248/278.1 |
| 6,109,855 | A | * | 8/2000 | Vela-Cuellar ......... B60P 1/5471 212/180 |
| 6,640,934 | B1 | * | 11/2003 | Edwards .................... B66B 9/00 182/141 |
| 6,769,858 | B1 | | 8/2004 | Butler |
| 6,889,779 | B2 | * | 5/2005 | Skarlupka, IV ........ E21B 7/028 173/148 |
| 7,201,552 | B1 | * | 4/2007 | Angel ...................... A22B 5/06 212/180 |
| 7,325,356 | B2 | * | 2/2008 | Norman ................. A01K 77/00 43/11 |
| 7,380,803 | B2 | * | 6/2008 | Thomas .................... B60R 9/06 224/519 |
| 8,397,835 | B1 | * | 3/2013 | Lyngaas ................. E21B 7/008 175/18 |
| 9,055,738 | B1 | | 6/2015 | Woller |
| 9,127,509 | B2 | * | 9/2015 | Robinson ................ E21B 7/027 |
| 2004/0195285 | A1 | * | 10/2004 | Pinard ...................... B60R 9/06 224/510 |
| 2008/0264990 | A1 | | 10/2008 | Riegert |
| 2008/0302601 | A1 | * | 12/2008 | Baker ....................... B66B 9/16 182/69.4 |
| 2010/0111658 | A1 | | 5/2010 | Galliano |
| 2010/0290876 | A1 | | 11/2010 | Conatser |
| 2013/0341124 | A1 | | 12/2013 | Robinson |
| 2015/0314989 | A1 | * | 11/2015 | Bruno ....................... B66B 9/16 187/254 |
| 2016/0107559 | A1 | | 4/2016 | Russo |

* cited by examiner

ADJUSTABLE CARRIER SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to an adjustable carrier system which aids in the lifting, lower, and transport of heavy objects by a vehicle such as an ATV.

Related Art

Any discussion of the related art throughout the specification should in no way be considered as an admission that such related art is widely known or forms part of common general knowledge in the field.

It is often necessary in a wide range of industries to transport large, bulky, or heavy objects from one location to another. For example, when gardening or landscaping, it is often necessary to transport large bags of soils or heavy stones between locations. As another example, when hunting it is often necessary to transport game from the location of the kill to another location.

In the past, various devices and methods have been utilized to aid with transporting such objects. Wheelbarrows are commonly used, but require significant effort on the part of the operator. Vehicles such as ATV's are now also in common use, but generally are limited in that their cargo areas are not adjustable by height or rotation. When such cargo areas are off the ground as is common with ATV's, an individual would be required to lift bulky or heavy objects to place them on the ATV to be transported.

SUMMARY

An example embodiment is directed to an adjustable carrier system. The adjustable carrier system includes a lower support which is adapted to be connected to a vehicle. A vertical support extends upwardly in a vertical orientation from the lower support. A winch includes a cable which extends through a lower pulley, upwardly alongside the vertical support, through an upper pulley, and downwardly alongside the vertical support to connect at its distal end to a sleeve. The sleeve is movably connected to the vertical support such that the cable may raise or lower the sleeve along the vertical support through use of a winch. A carrier for such as a basket or platform for holding an object is connected to the sleeve such that the carrier is also raised or lowered along the vertical support by the cable.

There has thus been outlined, rather broadly, some of the embodiments of the adjustable carrier system in order that the detailed description thereof may be better understood, and in order that the present contribution to the art may be better appreciated. There are additional embodiments of the adjustable carrier system that will be described hereinafter and that will form the subject matter of the claims appended hereto. In this respect, before explaining at least one embodiment of the adjustable carrier system in detail, it is to be understood that the adjustable carrier system is not limited in its application to the details of construction or to the arrangements of the components set forth in the following description or illustrated in the drawings. The adjustable carrier system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview.

An example adjustable carrier system generally comprises a lower support 20 which is adapted to be connected to a vehicle 12. A vertical support 30 extends upwardly in a vertical orientation from the lower support 20. A winch 22 includes a cable 26 which extends through a lower pulley 24, upwardly alongside the vertical support 30, through an upper pulley 60, and downwardly alongside the vertical support 30 to connect at its distal end to a sleeve 40. The sleeve 40 is movably connected to the vertical support 30 such that the cable 26 may raise or lower the sleeve 40 along the vertical support 30 through use of a winch 22. A carrier 50 for such as a basket or platform for holding an object is connected to the sleeve 40 such that the carrier 50 is also raised or lowered along the vertical support 30 by the cable 26.

B. Lower Support.

As best shown in FIGS. 1-6, the lift attachment system 10 generally includes a lower support 20 which is adapted to be connected to a vehicle 12. The lower support 20 may be integrally formed with a vehicle 12, such as during manufacture of an ATV, or may be adapted to be removably connected to a vehicle 12 as an after-market accessory.

The manner in which the lower support 20 is connected to the vehicle 12 may vary in different embodiments. In the exemplary embodiment shown in FIG. 5, the lower support 20 may include a hitch receiver 21 which is adapted to engage with a hitch on the vehicle 12. In this manner, the lower support 20 may be utilized to quickly and efficiently connect or remove the lift attachment system 10 to or from the vehicle 12.

Figure 5:
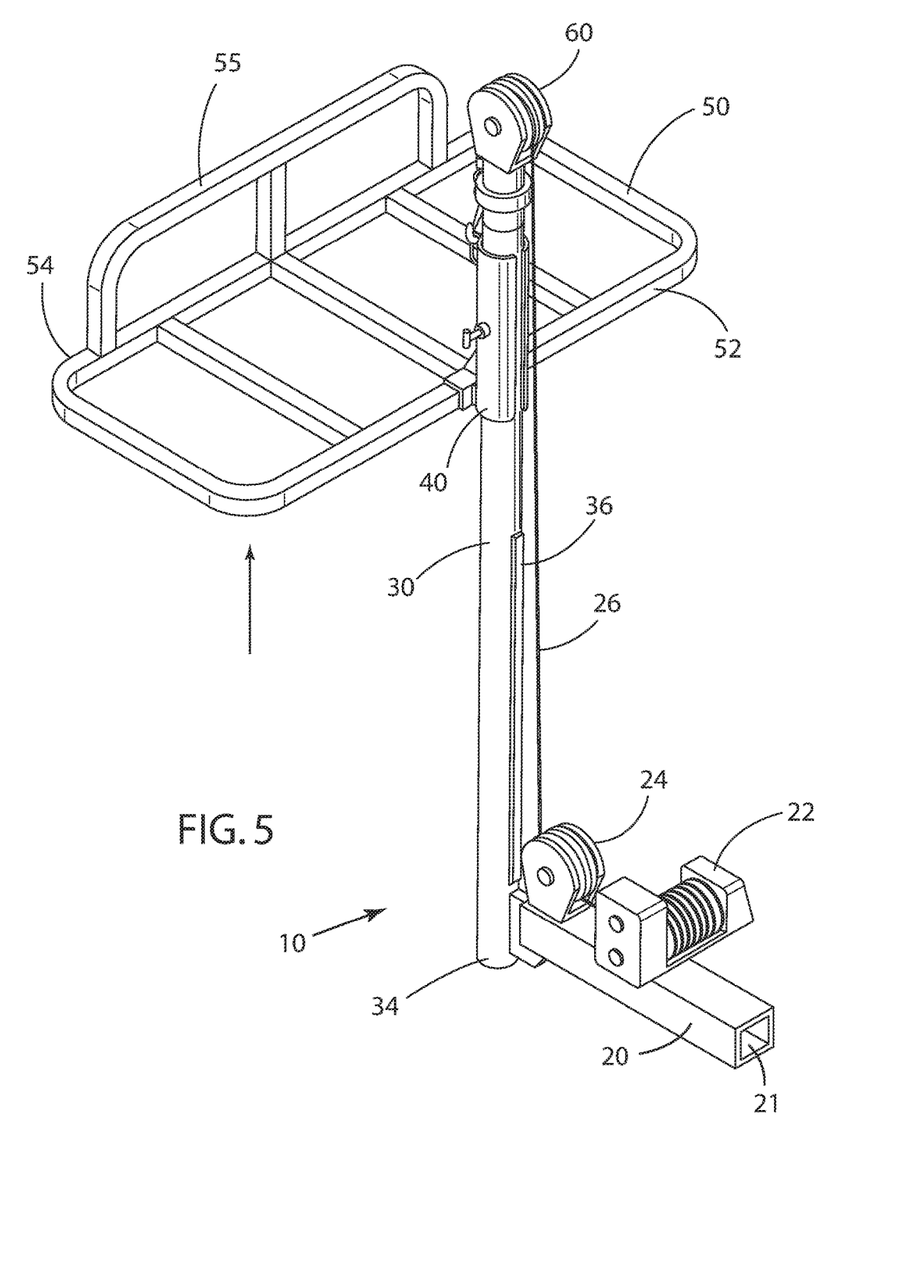
FIG. 5 is an upper perspective view of a lift attachment system with the carrier lifted upwardly in accordance with an example embodiment.

As best shown in FIG. 5, the lift attachment system 10 may include a winch 22. The winch 22 is illustrated as being positioned on the lower support 20, though in other embodiments the winch 22 may be positioned at various other locations, such as on the vehicle 12. The winch 22 will generally be wound with a cable 26 of sufficient strength to lift, lower, and support both the weight of the carrier 50 and any objects placed on the carrier 50.

Various types of winches 22 may be utilized. The winch 22 could be electrically powered or gas-powered. The winch 22 should be of sufficient strength to pull the cable 26 under significant stress and weight so as to support a wide range of objects. In a preferred embodiment, the winch 22 will be adapted to support up to 2000 pounds.

Figure 6:
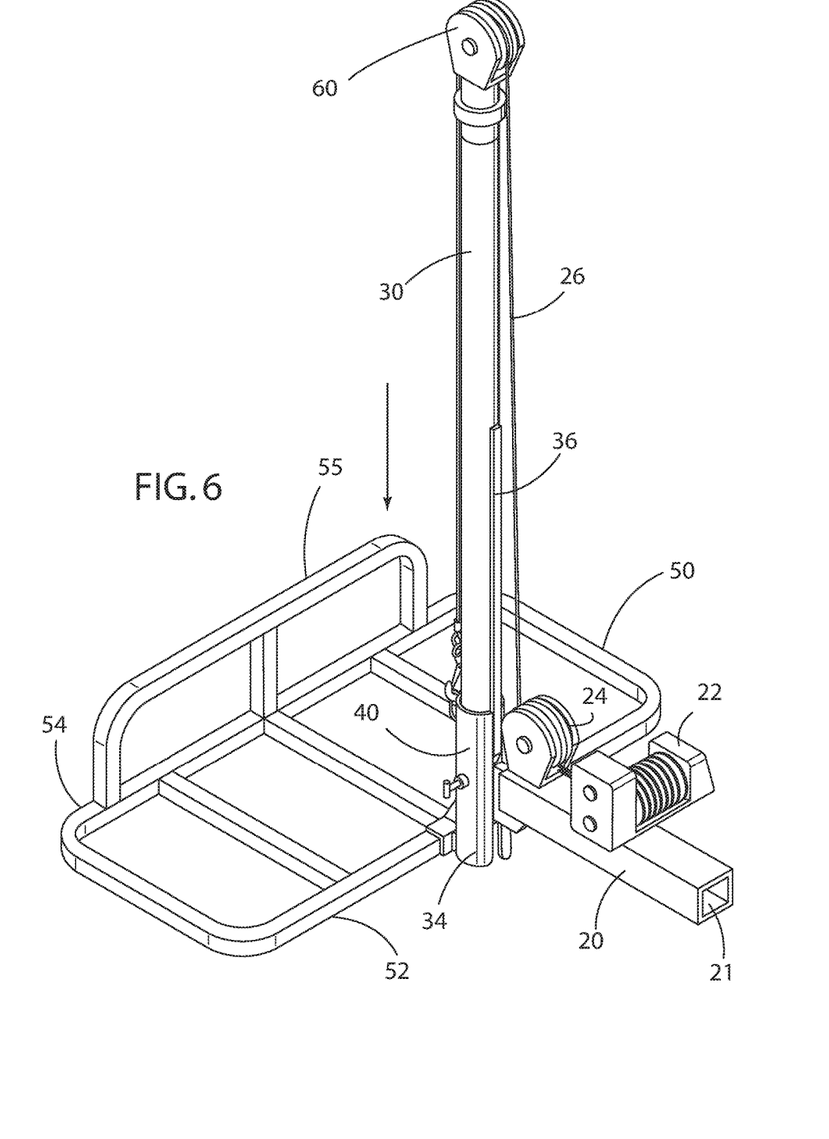
FIG. 6 is an upper perspective view of a lift attachment system with the carrier lowered downwardly in accordance with an example embodiment.

The lift attachment system 10 utilizes a lower pulley 24 through which the cable 26 extends after exiting the winch 22 such as shown in FIG. 6. The lower pulley 24 may be positioned on the lower support 20 with the winch 22 as shown in the figures. However, the location of the pulley 24 should not be construed as limited by the exemplary figures. The pulley 24 could be located at various other locations on the lift attachment system 10 or, in some cases, on the vehicle 12 itself.

The cable 26 will generally be connected to and wound around the winch 22 in a taut manner. The cable 26 will exit the winch 22 horizontally or, in some cases, diagonally, before being turned into a vertical or substantially vertical orientation by extending through the lower pulley 24. The cable 26 may extend alongside and substantially parallel with the vertical support 30 as shown in FIGS. 5 and 6. The cable 26 will then pass over an upper pulley 60 as discussed herein to extend downwardly alongside the vertical support 30 before connecting to the sleeve 40.

C. Vertical Support.

As shown in FIGS. 1-6, a vertical support 30 extends upwardly from the lower support 20 in a vertical orientation. The length of the vertical support 30 may vary depending on the application of the lift attachment system 10 and the desired range of vertical adjustment. The vertical support 30 in some embodiments may be integral with the lower support 20. In other embodiments, the vertical support 30 may be connected or attached to the lower support 20.

Figures 7, 8:
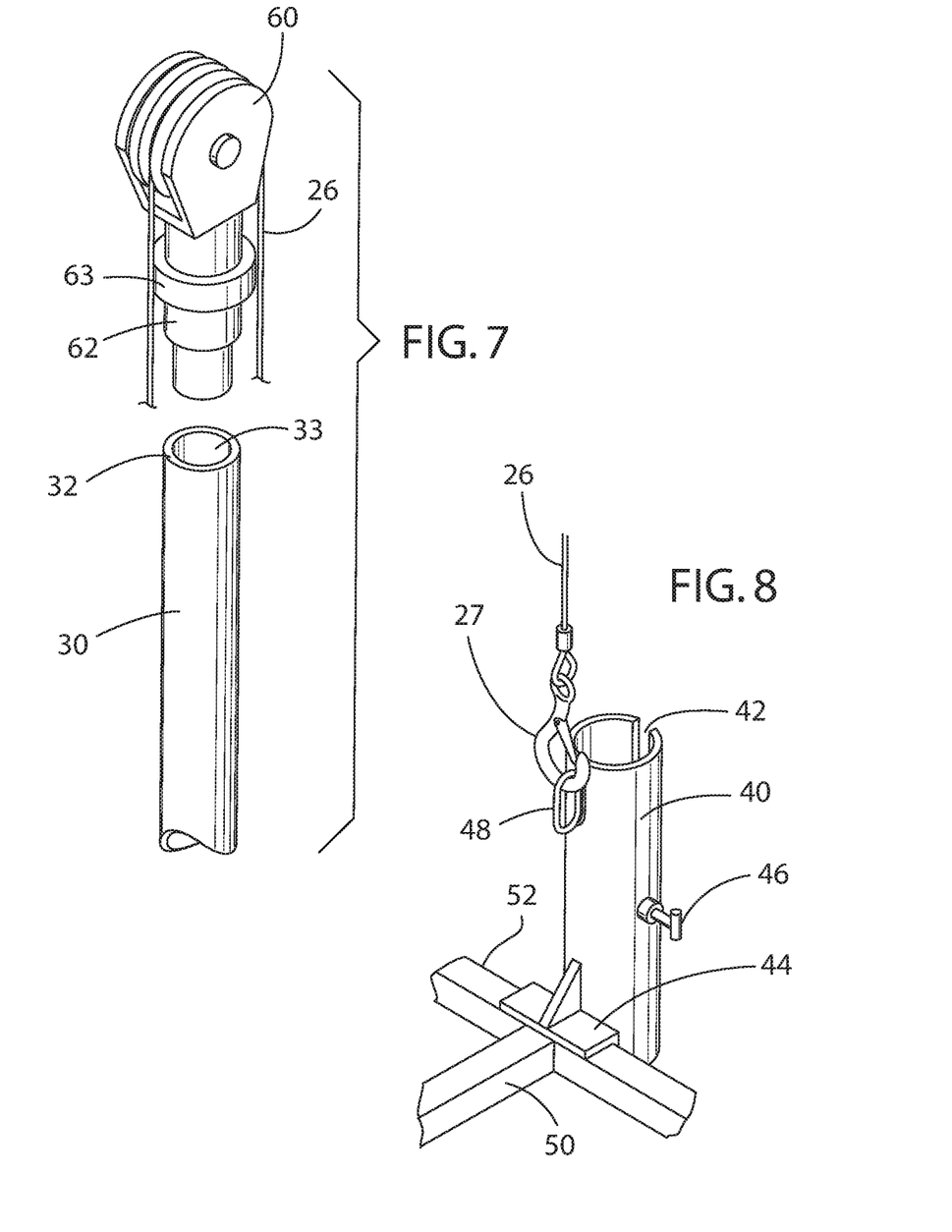
FIG. 7 is a perspective view of the upper end of the vertical support and upper pulley of a lift attachment system in accordance with an example embodiment.
FIG. 8 is a perspective view of a sleeve connected to a carrier of a lift attachment system in accordance with an example embodiment.

The upper end 32 of the vertical support 30 supports the upper pulley 60 as best shown in FIGS. 5-7. The lower end 34 of the vertical support 30 is generally connected to or integrally formed with the lower support 20. The upper pulley 60 may be integral with or fixedly connected to the vertical support 30. In other embodiments such as shown in FIG. 7, the upper pulley 60 may be removably connected to the vertical support 30.

In such embodiments, the vertical support 30 may include an upper opening 33 into which a connector on the upper pulley 60 may be inserted and frictionally retained. In other embodiments, various other methods may be utilized for securing the upper pulley 60 to the upper end 32 of the vertical support 30.

The upper pulley 60 is best shown in FIG. 7. As shown, a connector 62 extends downwardly from the upper pulley 60 to connect (removably or fixedly) the upper pulley 60 to the upper end 32 of the vertical support 30. In the embodiment shown in the figures, which is not intended to be limiting on the scope of the present invention, the connector 62 includes a flange 63 which rests on the upper end 32 of the vertical support 30 when the connector 62 of the upper pulley 60 is inserted within the upper opening 33 of the vertical support 30.

The vertical support 30 also supports the sleeve 40 as shown in FIG. XX. The sleeve 40 is slidably connected to the vertical support 30. In the exemplary figures, the sleeve 40 is positioned around the vertical support 30 such that the sleeve 40 may freely move vertically and rotationally when not subject to outside force. When not being lifted by the cable 26, the sleeve 40 will generally rest at or near the lower end 34 of the vertical support 30.

D. Sleeve.

As shown in FIGS. 1-6, a sleeve 40 is movably connected to the vertical support 30. The sleeve 40 is connected to the cable 26 such that when the winch 22 pulls the cable 26 inwardly, the sleeve 30 moves upwardly along the vertical support 30. When the winch 22 moves the cable 26 outwardly, the sleeve 30 moves downwardly along the vertical support 30 toward the lower support 20.

The sleeve 40 may comprise various shapes, sizes, orientation, and structures. Thus, the sleeve 40 should not be construed as limited by the exemplary figures. As best shown in FIG. 6, the sleeve 40 is illustrated as being approximately ⅛ of the length of the vertical support 30. The sleeve 40 could be longer or shorter in other embodiments.

The sleeve 40 may include a slot 42 formed therein as shown in FIGS. 6 and 7. The slot 42 may extend vertically between the lower end and upper end of the sleeve 40. A corresponding guide member 36 on the vertical support 30 fits within the slot 42. The sleeve 40 will not rotate when the guide member 36 is within the slot 42 as the guide member 36 will prevent rotation of the sleeve 40.

Figure 2:
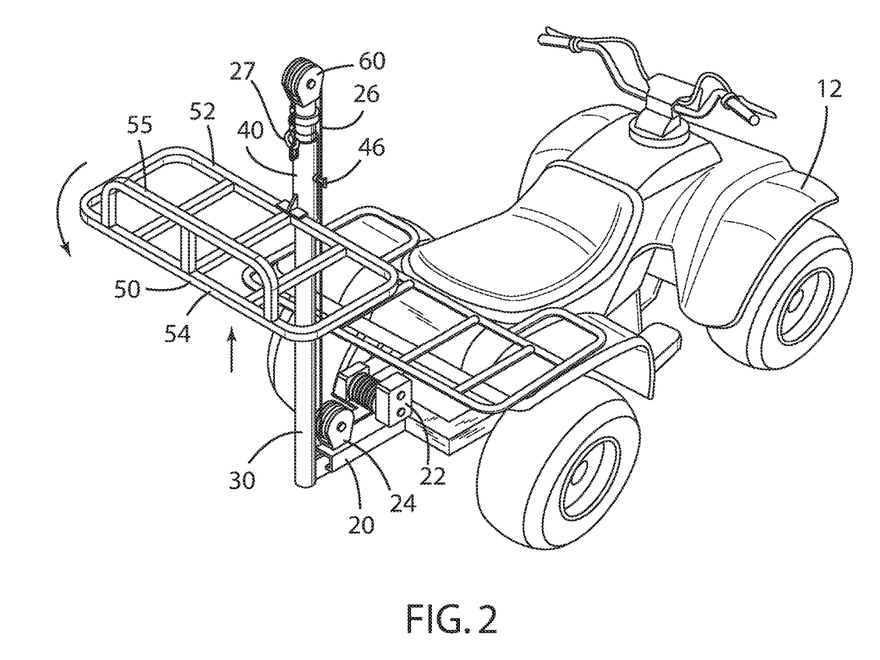
FIG. 2 is an upper perspective view of a lift attachment system in which a carrier is being lifted upwardly in accordance with an example embodiment.
Figure 3:
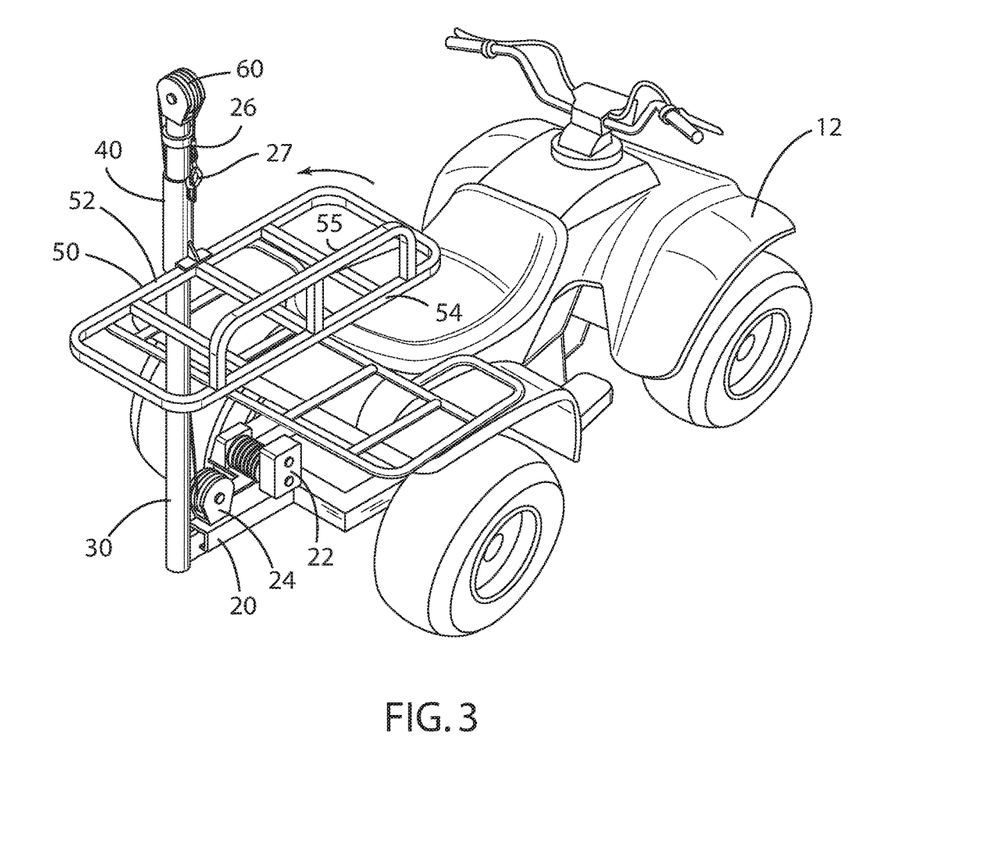
FIG. 3 is an upper perspective view of a lift attachment system in which a carrier is partially rotated in accordance with an example embodiment.
Figure 4:
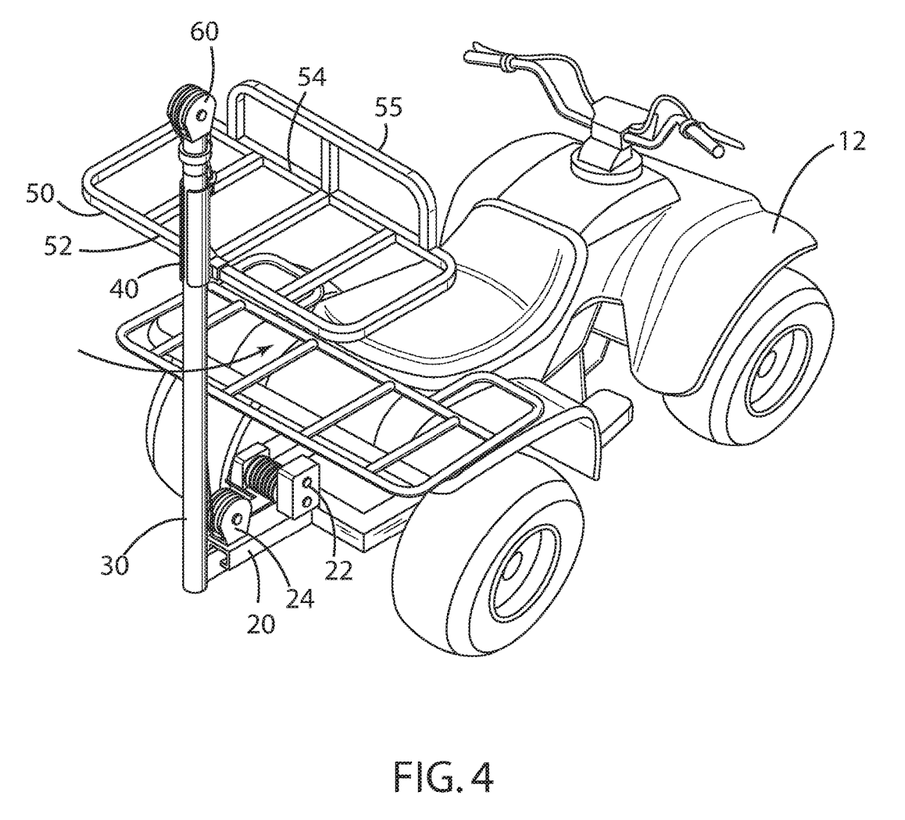
FIG. 4 is an upper perspective view of a lift attachment system in which a carrier is fully rotated in accordance with an example embodiment.

When the guide member 36 is not within the slot 42 of the sleeve 40 such as shown in FIG. 5, the sleeve 40 will be rotatable about the vertical support 30 such as shown in FIGS. 2-4. The guide member 36 is illustrated as extending along approximately the lower half of the length of the vertical support 30 to allow rotation of the sleeve 40 when the sleeve 40 is above the mid-point of the vertical support 30. This configuration may vary in different embodiments. For example, the guide member 36 could alternatively be positioned on the upper half of the length of the vertical support 30 such that the sleeve 40 is rotatable when on the lower half of the vertical support 30.

In other embodiments, the guide member 36 could be centrally located on the vertical support 30 such that the sleeve 40 may rotate when at the lower end or the upper end of the vertical support 30. In other embodiments, multiple guide members 36 may be utilized to create different areas of the vertical support 30 wherein the sleeve 40 may rotate. In other embodiments, guide members 36 may be included on the upper end and lower end of the vertical support 30 such that the sleeve 40 may rotate when centrally located along the length of the vertical support 30 between two of such guide members 36.

As shown in the figures, the guide member 36 may comprise a spline or elongated, raised member which extends along the vertical support 30. The shape, size, orientation, and configuration of the guide member 36 may vary in different embodiments. The width of the guide member 36 will preferably be just slightly smaller than the width of the slot 42 so that a tight fit is achieved without slack which could cause the sleeve 40 to wiggle, shake, or otherwise move rotatably when the guide member 36 is positioned therein.

As best shown in FIG. 8, the sleeve 40 may include a bracket 44 extending therefrom. The bracket 44 is used to connect the carrier 50 to the sleeve 40. The carrier 50 may be fixedly or removably connected to the bracket 44. In embodiments in which the carrier 50 is removably connected to the bracket 44, the carrier 50 may be interchanged to accommodate different functionality.

The positioning of the bracket 44 on the sleeve 40 may vary in different embodiments. In the figures, the bracket 44 is shown as being positioned on the lower end of the sleeve 40. In other embodiments, the bracket 44 could be positioned anywhere along the length of the sleeve 40, such as on the mid-point or upper end of the sleeve 40. In some embodiments, the bracket 44 may be omitted entirely, with the carrier 50 being fixedly or removably connected directly to the sleeve 40 by welding, clips, connectors, bolts, or the like.

As best shown in FIG. 8, the sleeve 40 may include a locking pin 46. The locking pin 46 may be adjusted between a locked position in which the locking pin 46 is inserted to frictionally engage with the underlying vertical support 30 and a released position in which the locking pin 46 is pulled outwardly to not contact or frictionally engage with the vertical support 30. When in the locked position, the locking pin 46 will prevent rotational and/or vertical movement of the sleeve 40 with respect to the vertical support 30. When in the released position, the sleeve 40 will be able to move vertically or rotate (so long as the guide member 36 is not within the slot 42) with respect to the vertical support 30.

Continuing to reference FIG. 8, the sleeve 40 may include an anchor 48 to which the cable 26 is connected. The anchor 48 may comprise a loop or other structure to which the cable 26 may be fixedly or removably connected. The anchor 48 may be positioned anywhere along the length of the sleeve 40 and thus should not be construed as limited to the upper end of the sleeve 40 as shown in the exemplary figures.

In the exemplary embodiment shown in FIG. 8, the cable 26 includes a cable connector 27 comprising a hook which is releasably connected to the anchor 48. Other configurations may be utilized in different embodiments. In some embodiments, an anchor 48 may be omitted; with the cable 26 being directly connected to the sleeve 40 in a fixed or removable manner.

E. Carrier.

As shown throughout the figures, a carrier 50 is connected to the sleeve 40 such that the carrier 50 is raised or lowered along the vertical support 30 along with the sleeve 40. The carrier 50 may be removably or fixedly connected to the sleeve 40, such as by a bracket 44 as shown in the figures. Whether connected to the sleeve 40 by a bracket 44, welding, or another structure, the carrier 50 will preferably be connected such that it will not warp, bend, or become otherwise structurally compromised due to the weight of an object stored on the carrier 50 when the carrier 50 is being lifted or lowered.

The shape, size, and configuration of the carrier 50 may vary in different embodiments. The carrier 50 may comprise a basket with raised outer walls, or may comprise a platform-like structure as shown in the figures. The inner end 52 of the carrier 50 will preferably be connected to the vertical support 30, such as by the bracket 44. The outer end 54 of the carrier 50 may include an outer support 55 comprising a railing or the like which will prevent objects from falling off the front of the carrier 50 when in use. In some embodiments, the outer support 55 may be omitted. In other embodiments, the outer support 55 may be rotatably connected to the carrier 50 so that the outer support 55 may be raised or lowered itself.

The carrier 50 may be utilized to lift, lower, and transport (by the vehicle 12) a wide range of objects. The height to which the carrier 50 may be lifted will vary in different embodiments to suit different functionalities and vehicles 12. By way of example, the carrier 50 could be lifted to 38 inches above the ground in some embodiments. The carrier 50 may be lowered to ground level in some embodiments, or may be lowered to points above ground level in other embodiments. The range of movement of the carrier 50 both vertically and rotationally may vary widely to suit different applications and should not be construed as limited by the exemplary figures.

In some embodiments, the carrier 50 may be removed from the vertical support 30. This may be accomplished in some embodiments by disconnected the carrier 50 from the bracket 44 or disconnecting the bracket 44 from the vertical support 30. In other embodiments, the upper pulley 60 may be removed from the upper end 32 of the vertical support 30 so that the sleeve 40 and carrier 50 may be pulled off the vertical support 30 over its upper end 32.

F. Operation of Preferred Embodiment.

In use, the lower support 20 may be connected to the vehicle 12 if it is not integral with the vehicle. The lower support 20 may be connected to the vehicle 12 in various manners, such as by connecting to a hitch on the vehicle 12 or by being interconnected to a bumper on the vehicle 12 in various other manners. Although the figures illustrate that the lower support 20 is connected to the rear end of the vehicle 12, in some embodiments the lower support 20 may be connected instead to the front of the vehicle 12 or on one of the sides of the vehicle 12. The positioning of the lift attachment system 10 may vary widely in different embodiments and thus should not be construed as limited by the exemplary figures.

With the lower support 20 connected to the vehicle 12, the present invention is ready for use. To load an object on the carrier 50, the carrier 50 is first lowered by extending (unspooling) the cable 26 from the winch 22 such that the sleeve 40 is lowered to the lower end 24 of the vertical support 30. The carrier 50 will then rest on the ground or near the ground to be loaded with an object such as a barrel, game, or the like.

With the carrier 50 loaded, the carrier 50 may be lifted upwardly. The cable 26 is retracted by the winch 22 which raises the sleeve 40 along the vertical support 30 to raise the carrier 50. When at a desired height, the winch 22 may be stopped. For additional reinforcement to prevent movement, the locking pin 46 may be engaged.

If desired, the carrier 50 may be rotated as shown in FIGS. 2-5. This may be desirable to position the carrier 50 over the rear end of the vehicle 12 as shown in FIG. 4. This may provide access to the object in the carrier 50 when the vehicle 12 is in use, or may be utilized to limit the overall length of the vehicle 12 by preventing the carrier 50 from hanging out from its rear end.

Figure 1:
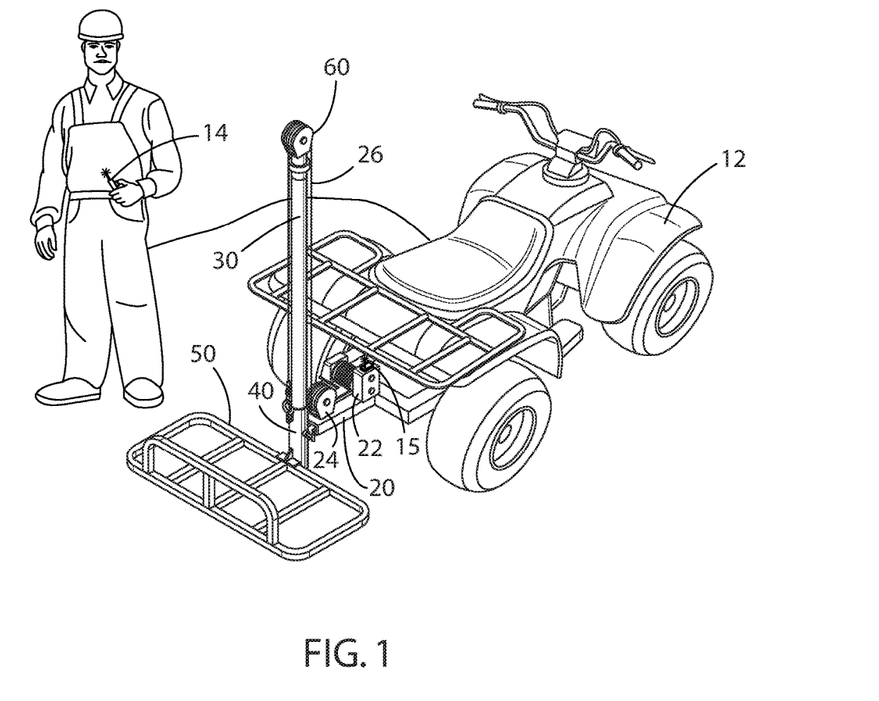
FIG. 1 is a perspective view of a lift attachment system in use in accordance with an example embodiment.

If engaged, the locking pin 46 will be disengaged so that the sleeve 40 and carrier 50 may be rotated with respect to the vertical support 30. So long as the sleeve 40 is positioned along a portion of the vertical support 30 which does not include a guide member 36, the carrier 50 and sleeve 40 may be manually rotated about the vertical support such as shown in FIGS. 2-5. Once in a desired rotational position with respect to the vertical support 30, the locking pin 46 may be engaged again to prevent further rotation of the carrier 50 and sleeve 40. As shown in FIG. 1, the winch 22 may be remotely controlled in some embodiments. In such embodiments, the winch 22 may include a receiver 15 which is adapted to receive a signal from a corresponding remote 14. The remote 14 will transmit the signal to the receiver 15, which will cause the winch 22 to extend or retract the cable 26 to raise or lower the sleeve 40 and carrier 50. Various types of remotes 14 and receivers 15 may be utilized. In some embodiments, the remote 14 may comprise a mobile device such as a smart phone.

Unless otherwise defined, all technical and scientific terms used herein have the same meaning as commonly understood by one of ordinary skill in the art to which this invention belongs. Although methods and materials similar to or equivalent to those described herein can be used in the practice or testing of the adjustable carrier system, suitable methods and materials are described above. All publications, patent applications, patents, and other references mentioned herein are incorporated by reference in their entirety to the extent allowed by applicable law and regulations. The adjustable carrier system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. An adjustable carrier system, comprising:
   a vehicle including a hitch attached to the vehicle;
   a vertical support adapted to be connected to the hitch of the vehicle;
   a guide member extending along a non-rotatable portion of the vertical support;
   a sleeve movably connected to the vertical support, wherein the sleeve comprises a slot adapted to engage with the guide member to prevent rotation of the sleeve with respect to the vertical support when the sleeve is positioned along the non-rotatable portion of the vertical support, wherein the sleeve is rotatable with respect to the vertical support when the sleeve is not positioned along the non-rotatable portion of the vertical support, wherein the sleeve comprises a locking pin, wherein the locking pin is adapted to selectively prevent movement of the sleeve with respect to the vertical support;
   a cable connected to the sleeve;
   a winch for raising or lowering the sleeve with respect to the vertical support, wherein the cable is connected to the winch;
   a lower pulley positioned near a lower end of the vertical support, wherein the cable extends through the lower pulley and upwardly alongside the vertical support;
   an upper pulley positioned near an upper end of the vertical support, wherein the cable extends through the upper pulley and downwardly alongside the vertical support; and
   a carrier connected to the sleeve such that the carrier is lifted or lowered by the cable along with the sleeve, wherein the carrier is comprised of a basket.

2. The adjustable carrier system of claim 1, wherein the carrier is removably connected to the sleeve.

3. The adjustable carrier system of claim 1, further comprising a bracket connecting the carrier to the sleeve.

4. The adjustable carrier system of claim 1, wherein the sleeve is connected around the vertical support.

5. The adjustable carrier system of claim 1, wherein the guide member extends along half of the length of the vertical support.

6. The adjustable carrier system of claim 1, wherein the upper pulley is removably connected to the vertical support.

7. The adjustable carrier system of claim 1, wherein the sleeve is removably connected to the vertical support.

8. The adjustable carrier system of claim 1, wherein the vehicle comprises an ATV.

9. The adjustable carrier system of claim 1, wherein the hitch is positioned at a rear end of the vehicle.

10. The adjustable carrier system of claim 1, wherein the vertical support comprises a lower support, wherein the lower support is adapted to be connected to the hitch of the vehicle.

* * * * *